United States Patent Office 3,507,041
Patented Apr. 21, 1970

---

3,507,041
COUPLING AGENT BETWEEN DENTAL ENAMEL AND RESTORATIVE MATERIAL
Harold C. Walraven, Jr., and Willis E. Moody, Jr., Atlanta, Ga., assignors to the United States of America as represented by the Secretary of Health, Education, and Welfare
No Drawing. Filed Apr. 30, 1968, Ser. No. 725,477
Int. Cl. A61k 5/02
U.S. Cl. 32—15                4 Claims

---

ABSTRACT OF THE DISCLOSURE

Selected zirconium compounds are applied to the walls of cavities before the insertion of the restorative material used for the filling. The zirconium compounds act to create a bond between the tooth and the restorative material.

---

The present invention relates to the use of selected zirconium compounds to create a bond between the tooth and the restorative material.

The restorative materials presently being used establish little if any bond with the dental enamel. They are primarily held in place by mechanical interlocking with the tooth. Such a mechanical interlock produces a porous interface between the enamel and the restoration permitting the penetration of bacteria and chemical corrosive agents. This penetration is now the primary cause of additional caries, enlargement of the cavity, and loss of the restorative material.

It is the object of this invention to overcome the above problems by creating a positive bonding action between the material and the dental enamel, thus creating a nonporous interface between the restoration and the tooth. By creating this nonporous interface and thus eliminating the bacterial and chemical penetration, a permanent restoration is obtained and the tooth will not require additional dental care for the particular cavity involved.

The thermal analysis data obtained while investigating the nature of the dental enamel-restoration interface indicated that there is an $H_2O$ film on the surface of a newly prepared cavity. This $H_2O$ film was found to create a strong bond with the dental enamel, thereby preventing the formation of a bond between the tooth and the restorative material. Therefore, removal or replacement of the film became necessary in order to create a permanent restoration. Under ordinary clinical conditions, removal of the $H_2O$ film is not practical. Besides, since the $H_2O$ film has already created a bond with the dental enamel, replacement of the $H_2O$ would provide an opportunity to take advantage of this existing bond.

Thus the object was to find a material that would replace the $H_2O$ film and itself create a bond with the dental enamel. Because of the bonding characteristics of the zirconium atom, it was felt that perhaps zirconium compounds could be used to replace the $H_2O$. Thus several zirconium compounds were chosen and tested as possible dental coupling agents.

The testing performed using the zirconium compounds showed that the zirconium element replaces the $H_2O$ to create the link to form a positive bond between the dental enamel and the restorative material. The following examples of the testing performed illustrates the inventive concept of the invention.

EXAMPLE I

Application of the coupling agents to the cavities

The zirconium compounds tested were: $ZrOOHCl$; $HZrO_2H(C_2H_3O_2)_2$; $K_2ZrF_6$; $Na_2ZrO(SO_4)_2$; and $$(NH_4)_3ZrOH(CO_3)_3$$

The compounds were applied individually and in combination to the walls of cavities prepared in freshly extracted teeth. The combination of solutions was limited to only two compounds per trial. Each solution was saturated and adjusted to pH 2 with HCl. After application of the zirconium compounds, half the cavities were washed with distilled water prior to drying with cotton swab and air for brushing in an acrylic filling. A minimum of 25 teeth was used for each combination that appeared to create a bond.

EXAMPLE II

Testing the porosity of the enamel-restoration interface

After the application of the zirconium compound and the insertion of the acrylic filling, the teeth were immersed in a porosity-test solution (American Society for Testing Materials designation—distilled water 50%, ethyl alcohol 50%, plus 2% fuchsine dye) for three days. To prevent smearing of the dye across the interface, a sharp blow by means of an ordinary hammer was used for breaking the teeth for examination under a sterioscopic microscope.

Dye penetration through the zirconium coating into the interface was visually observed and compared to a control standard. A relative index of 0 to 10 was used to designate the degree of dye penetration, with 0 representing no penetration into the interface. A value of 10 represented penetration along all the surfaces between filling and tooth and into the dentin.

EXAMPLE III

Results of the porosity tests

The best results were obtained from the following compounds or mixtures (listed in the order of their effectiveness):

(1) A saturated solution of $K_2ZrF_6$, adjusted to pH 2 with HCl and not washed with distilled water, gave an average penetration index of less than ½, with only 4 of 25 runs actually showing a small leakage;

(2) $K_2ZrF_6$, adjusted to pH 2 and washed, gave an average index of 1;

(3) $K_2ZrF_6$, mixed equally with $ZrOOHCl$ and not washed, gave an average index of 1;

(4) $Na_2ZrO(SO_4)_2$, adjusted to pH 2 with $Na_2CO_3$ and washed, gave an average index of 1½;

(5) $Na_2ZrO(SO_4)_2$, adjusted to pH 2 with $Na_2CO_3$ and not washed, gave an average index of 2½.

All other solutions tested were much less effective. The control samples had an average penetration index of greater than 5.

While the invention has been described above in terms of certain examples and embodiments, it will be obvious to those skilled in the art that changes and modifications may be made without departing from the essence of the invention. Thus it should be understood that the specific examples are illustrative and not restrictive, and that all modifications that fall within the meaning and scope of the following claims are intended to be included therein.

We claim:
1. The method of bonding restorative material to the dental enamel to create a nonporous interface between the tooth and the restoration by applying a saturated solution of a zirconium compound or a saturated solution of a mixture of zirconium compounds, each solution adjusted to optimize the pH for maximum ionization of the zirconium ion, to the surface of a freshly prepared cavity before the insertion of the restorative material.
2. The method of claim 1 wherein the compound is $K_2ZrF_6$.
3. The method of claim 1 wherein the compound is $Na_2ZrO(SO_4)_2$.
4. The method of claim 1 wherein the mixture of compounds is $K_2ZrF_6$ mixed equally with ZrOOHCl.

References Cited

UNITED STATES PATENTS

| | | | |
|---|---|---|---|
| 3,266,147 | 8/1966 | Goldman | 32—15 |
| 3,462,839 | 8/1969 | Boyer et al. | 32—15 |

ROBERT PESHOCK, Primary Examiner